US007271398B2

(12) United States Patent
Androsyuk et al.

(10) Patent No.: US 7,271,398 B2
(45) Date of Patent: Sep. 18, 2007

(54) REFLECTIVE OPTICAL SENSOR FOR BILL VALIDATOR

(76) Inventors: Sergiy Androsyuk, 1 Pemberton Ave., Apt. 505, Toronto, Ontario (CA) M2M 4L9; Dmitro Baydin, 1137 Royal York Rd., Apt. 410, Toronto, Ontario (CA) M9A 4A7; Yuriy Rusakov, #507B-1139 Royal York Rd., Etobicoke, Ontario (CA) M9A 4AB; Mykhaylo Bazhenov, 35-A Zakrebskogo Str., Apt. 111, Kiev, Ukraine (UA) 02217; Gennadiy Gaponyuk, 2 Forest Laneway, Apt. 1810, Toronto, Ontario (CA) M2N 5X7; Oleksandr Lukonin, 311 Pinewood Dr., Thornhill, Ontario (CA) L4J 5S2

( * ) Notice: Subject to any disclaimer, the term of this patent is extended or adjusted under 35 U.S.C. 154(b) by 216 days.

(21) Appl. No.: 11/009,061

(22) Filed: Dec. 13, 2004

(65) Prior Publication Data

US 2005/0127305 A1 Jun. 16, 2005

(30) Foreign Application Priority Data

Dec. 12, 2003 (CA) .................................. 2453229

(51) Int. Cl.
*G01N 21/64* (2006.01)

(52) U.S. Cl. .............................. 250/461.1; 250/461.1; 382/135

(58) Field of Classification Search ............ 250/431.1; 382/135
See application file for complete search history.

(56) References Cited

U.S. PATENT DOCUMENTS

| | | | | |
|---|---|---|---|---|
| 5,467,406 | A * | 11/1995 | Graves et al. | 382/135 |
| 5,616,915 | A | 4/1997 | Simpkins et al. | |
| 5,988,345 | A | 11/1999 | Bergeron et al. | |
| 6,044,952 | A | 4/2000 | Haggerty et al. | |
| 6,573,983 | B1 * | 6/2003 | Laskowski | 356/71 |
| 2002/0195571 | A1 * | 12/2002 | Kamijo et al. | 250/458.1 |
| 2004/0021850 | A1 * | 2/2004 | Evans et al. | 356/71 |

FOREIGN PATENT DOCUMENTS

GB 2 376 788 12/2002

* cited by examiner

*Primary Examiner*—David Porta
*Assistant Examiner*—Christine Sung

(57) ABSTRACT

A simple high optical efficiency reflective optical sensor for bill validator uses an inexpensive bulb having a case which is transparent to efficient luminous radiation. This case is used as a wave guide to return reflected radiation to at least one photo detector situated directly under the transparent bottom of the case. The bulb emits a narrow beam of light and is positioned in close proximity and perpendicular to a bill surface and illuminates it. The light reflected or fluoresced by the bill is collected widely with a convex lens end of the bulb case and this collected radiation is transmitted through the bulb case to the at least one photo detector. Preferably, the bulb is a light emitting diode.

19 Claims, 6 Drawing Sheets

REFLECTIVE OPTICAL SENSOR FOR BILL VALIDATOR

FIELD OF THE INVENTION

The present invention relates to bill validators, having an optical sensor means for measuring the reflectance and transmittance of paper bills as they move past the optical sensor. The sensor includes a radiation emitter which also acts to direct reflected radiation to a photodetector. This sensor may also be used as common reflective sensor for detection of various index marks with relatively small space dependence.

BACKGROUND OF THE INVENTION

Bill validators used in vending machines and the like typically utilize various styles of reflective optical sensors to obtain measurements from an inserted bill to determine authenticity, denomination and location. Typically, the bill is transported past at least one photosensor, having a light-emitting diode (LED) and photodetector (photodiode or phototransistor).

Some factors that adversely affect the bill measurements include the following: inserted bills are of different denominations, cleanliness and quality; bill may be creased or crumpled, and the bill location and inclination across passageway may strongly vary. In addition, the output power of LED can vary due to age and/or ambient conditions. Furthermore, there are normal production variations in LED optical power output and detector sensitivity, which can lead to sensors having varying current and voltage requirements in order to operate effectively. In order to partially offset these factors, optical sensor measurements are taken over a large dynamic range. As power of LED and sensitivity of photodetector are limited, the optical efficiency should be high to improve the performance of the sensors.

In the art, many embodiments of reflective optical sensors are known. The simple sensors comprise at least one photo emitter and one photo detector with relatively wide spatial diagrams (U.S. Pat. Nos. 4,348,656; 4,628,194; 5,222,584; 5,476,169; 5,692,067; 5,751,840; 5,855,268; 5,889,883; 5,909,503; 5,960,103). Such sensors have low optical efficiency and their output signal strongly depends on bill location and inclination across passageway. The space required to mount the sensors (footprint) slightly exceeds the total area of the emitters and detectors.

To improve optical efficiency, many sensors mount the emitters and detectors at an angle to one another and converging on the bill surface (U.S. Pat. Nos. 4,041,456; 4,628,194; 4,973,851; 5,420,406; 5,467,405; 5,483,069; 5,918,960; 5,992,601; 6,028,951; 6,073,744). These sensors require special optical heads, receptacles etc. The footprint for these sensors significantly exceeds the total area of emitters and detectors due to the various mounting and carrying paths. Even with this more complicated design, the output signal from these sensors strongly depends on bill location and inclination across passageway.

Advanced sensors in addition to plurality of LED's and photo detectors comprise various focusing, light guiding and reflecting elements, including fiber optic "fish tails" and splitters (U.S. Pat. Nos. 5,308,992; 5,381,019; 5,616,915; 6,044,952; 6,104,036; 6,163,036; 6,188,080; 6,359,287; 6,392,863). These sensors are more complicated, large and expensive, require special optical parts and often require additional alignment during validator assembly. The output signal of these advanced sensors continues to be largely dependent on bill location and inclination across passageway.

Some special optical sensors conduct bill scanning by means of LED's and detectors arrays with special lenses or by direct TV image or light beam scanning (U.S. Pat. Nos. 4,179,685; 4,197,584; 4,293,776; 6,363,164). This technology is expensive and is not suitable for mass production and utilization.

Some optical shadow on a bill may occur with the majority of prior art sensors because of bill inclination, illumination or observation.

It is a general object of the present invention to provide a simple reflective space efficient sensor having high optical efficiency for bill examination and other applications.

The present invention overcomes a number of the disadvantages described above with respect to the prior art sensors.

SUMMARY OF THE INVENTION

A validation device for sensing the authenticity of bills according to the present invention comprises a bill passageway, an optical sensing arrangement to one side of the passageway and opening onto the passageway for directing radiation onto a bill as it moves past the sensor and for receiving radiation reflected from the bill; an arrangement for processing an output signal of the optical sensing arrangement produces an eluation signal. An evaluation system uses the evaluation signal and based thereon, makes a prediction of the authenticity of the bill. The optical sensing arrangement includes a bulb emitter encased in a case transparent to luminous radiation and at least one photodetector is situated to receive radiation emitted by the bulb emitter and reflected by a bill and returned to the photodetector by passing through the plastic case of the bulb emitter.

According to an aspect of the invention, the bulb emitter is a light emitting diode device preferably with a plastic case.

According to yet a further aspect of the invention, the case of the light emitting diode device includes a convex end which faces the bill passageway and acts as a lens to direct emitted radiation onto the bill and to receive and direct radiation impinging on the convex lens through the case to the photodetector.

In yet a further aspect of the invention, the plastic case has a generally flat transparent base adjacent the photodetector and the photodetector is located below the base.

In yet a further aspect of the invention, the convex end of the case is immediately adjacent the bill passageway.

In yet a further aspect of the invention, the convex end of the case is of a width greater than the spacing between the convex end and the center line of the bill passageway.

In yet a further aspect of the invention, the case acts as a light guide for focusing radiation emitted by the bulb emitter and reflected from the bill onto the photodetector.

In yet a further aspect of the invention, the light emitting diode is a directional emitter directing emitted radiation generally through the convex end of the case.

In yet a further aspect of the invention, the light emitting diode is designed to emit ultraviolet radiation.

In yet a further aspect of the invention, a validation device comprises the ultraviolet absorbing thin film filter between light emitting diode base and photo detector.

In yet a further aspect of the invention, the opposite to light emitting diode part of outlying passageway wall is made from white non luminescent material.

In yet a further aspect of the invention, the optical sensor includes white light emitting diode and at least two photo detectors with band-pass or rejection colored thin film filters between light emitting diode base and said photo detectors.

In yet a further aspect of the invention, the optical sensor includes multicolor multi chip light emitting diode with at least one photo detector adjacent to light emitting diode base.

In yet a further aspect of the invention, optical sensor includes the opaque cap round said light emitting diode with end slit for bar-code reading and bill edge detection.

Additionally in accordance with preferred embodiment of the present invention, there is provided a method of bill ultraviolet examination including perpendicular narrow-beam illumination of a portion of a bill surface by means of a transparent body bulb ultraviolet light emitting diode, and collection of the mirror and diffuse reflected ultraviolet light and fluorescent light from the illuminated bill portion by light emitting diode convex end, and transmission of this collected light throw transparent light emitting diode body to at least one photo detector adjacent to said light emitting diode base and filtering of said transmitted light with an ultraviolet absorption filter between said light emitting diode base and detector, and detection of transmitted light with planar PIN photo diodes, and processing of output photo signal for bill identification and validation.

Also provided, in accordance with preferred embodiment of the present invention, is a method for simultaneous evaluation of optical characteristics of a bill including perpendicular narrow-beam illumination of part of a bill surface by means of a white light emitting diode with a transparent bulb body having a convex end, and collection of the mirror and diffuse reflected light from the illuminated bill part using the convex end of the light emitting diode, and transmission of collected light through the transparent light emitting diode body to photo detectors adjacent to a base of the light emitting diode and filtering of transmitted light with absorption and/or bend-pass filters, and detection with planar PIN-photodiodes, and separate processing of steady and alternate photo signal components from each photo detector for bill identification and validation.

Further provided, in accordance with preferred embodiment of the present invention, is a method for sequential evaluation of optical characteristics of a bill including: sequential perpendicular narrow-beam illumination of part of a bill surface with varicolored light by means of a transparent body bulb multi color multi chip light emitting diode, and collection of mirror and diffuse reflected light from the illuminated bill part by means of a convex end of the light emitting diode, and transmission of collected light through the transparent body of the light emitting diode to a photo detector adjacent to a base of the light emitting diode, and sequential detection and processing of said varicolored light components for bill identification and validation.

Additionally provided, in accordance with preferred embodiment of the present invention, is method for bar code reading and bill edge detection including perpendicular narrow-beam illumination of separate bar or bill edge throw slit in opaque light emitting diode cap, and collection of the mirror and diffuse reflected light from illuminated surface throw said slit by means of light emitting diode convex end, and transmission of the collected light throw transparent light emitting diode body to photo detector adjacent to light emitting diode base, and detection of transmitted light with planar photo detector, and processing of alternate photo signal component from photo detector for bar code identification and bill edge location.

In operation light emitting diode with narrow diagram is positioned perpendicularly and in close proximity to the bill surface to illuminate part thereof. The illuminated part of the bill surface is practically equal to from the size of the light beam emitted from the light emitting diode. The power of the light reflected back in a particular direction is proportional to the degree of specularity and the diffuse behavior of the bill surface. Bills contain both specular and diffuse surfaces as part of their design and material properties with the main surface being predominantly diffuse. Use of highly reflective devices such as plastic blazed holograms, metallized labels and threads creates areas of specular reflection. Additionally, the bill (substrate or/and dye) often emits fluorescent light of a certain wavelength (or several wavelengths) when irradiated with ultraviolet light. To obtain good optical information about the bill under investigation, all light components outgoing from the illuminated bill surface should be collected. Under perpendicular illumination specular reflected light propagates in exactly opposite direction. Diffuse and fluorescent components propagate more uniformly (in general according to so-called cosine law). Due to small gap between the light emitting diode and the bill, most of the outgoing light from the illuminated bill surface is collected with the convex end of the light emitting diode and is transmitted to the photo detector through the transparent light emitting diode body. With this arrangement, the light emitting diode body is used as a total reflection light guide and collector without any additional optical parts. Such an arrangement has low sensitivity to bill vibration and inclination in the passageway at inclination angles up to the maximum light emitting diode beam aperture (commonly 8-12°) by reason of insignificant variations of perpendicular to bill light power within this angle aperture. Additionally, due to the narrow light emitting diode aperture, ambient light-striking the bill surface is also insignificant for bill testing.

Transmitted light through the light emitting diode body is detected with broad band and selective photo detectors situated under the transparent light emitting diode base. Low-cost thin film band-pass or absorption rejection filters are used in conjunction with hardware/software subtraction provides an integrated intensity and separate color (including ultraviolet reflection) signals from the bill under investigation.

Using an opaque cap round light emitting diode with an end slit in conjunction with its narrow diagram and alternate signal component processing provides stable contrast signal under bar-code reading and bill edge detection.

Several embodiments of the present invention will now be described by way of example with reference to the accompanying drawings.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
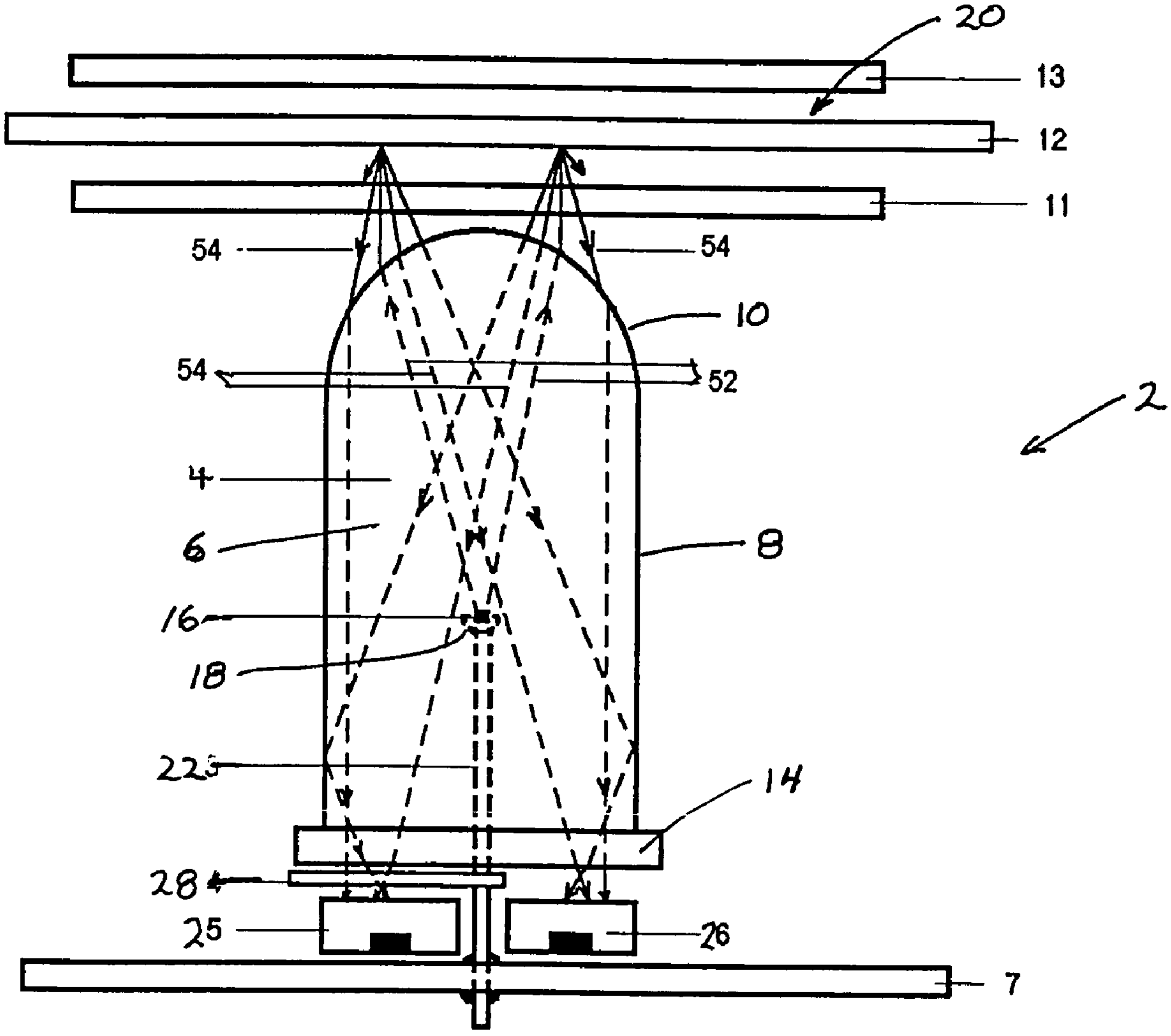
FIG. 1 is an enlarged side view of optical sensor for bill ultraviolet testing.

The optical sensor 2 shown in FIG. 1 is positioned for emitting radiation to eradiate the bill 12. The surface characteristics of the bill alter the radiation which is reflected from the bill and returned to the optical sensor. The bill 12 is transported through the bill passageway 20 defined by an exterior wall 13 and a light transparent wall 11.

The optical sensor 2 has a light emitting diode (LED) 4, positioned to one side of the passageway 20 and located immediately adjacent the transparent wall 11. The light emitting diode 4 has a transparent case 6 with a generally cylindrical portion terminating at one end in the convex lens portion 10 and closed at the other end by the quasi planar base 14. The case 6 is preferably of a plastic or other light transmitting material. Radiation 52 produced by the LED 4 passes through the plastic case. Generally centered within the case is a luminous chip 16 centrally located in a non light transmitting concave recess 18. The luminous chip 16 is connected by a pair of leads 22 to a power source. Radiation from the luminous chip 16 generally passes in a parallel manner through the convex lens 10 of the plastic case 6. The radiation produced by the LED is generally through the end of the LED and produces a narrow beam of radiation for eradiating the bill 12. The radiation produced by the LED strikes the bill and depending upon the characteristics of the bill, is reflected from the surface thereof. A portion of this reflected radiation 54 strikes the convex lens 10 of the LED and passes therethrough and is guided to the base 14 of the LED and through the base to photodetectors 25 and 26 located exterior to the based of the LED.

From the above, it can be appreciated that the casing of the LED acts as a light guide for directing reflected radiation from the bill, which strikes the convex end of the plastic case of the LED to the photodetectors located below and outside of the LED. Both the LED 4 and the photodetectors 25 and 26 are mounted on the printed circuit board 7 and the signals from the photodetectors are processed by circuitry on the printed circuit board.

The diameter of the cylindrical walls 8 of the LED are of the order of 5 mm and the radiation produced by the LED is generally of this width and it is generally directed in a perpendicular manner towards the surface of the bill 12. The bill 12 is spaced from the convex end 10 of the LED up to approximately 3.5 mm. It can thus be appreciated that the beam of radiation is wide relative to the distance of separation from the LED to the bill. The convex end 10 serves to focus reflected radiation back onto the photo diodes 25 and 26. With this arrangement, most of the outgoing radiation which serves to illuminate the bill surface and is reflected therefrom, is collected by the LED convex lens and transmitted to the photodetectors. It has generally been found that this arrangement results in a reflected signal which is maintained within a much tighter tolerance even with changes in location of the bill in the passageway, the condition of the bill and the inclination thereof.

It has been found that the reflected signal is typically in the range of 60% to 85% of the produced signal. Thus the optical signal would change up to approximately 30% under bill displacement across the passageway of up to 2 mm. The beam of radiation produced by the LED is relatively narrow, typically between 8 and 12 degrees. The close positioning of the LED to the bill and the use of the LED as a wave guide to return the reflected radiation, results in a signal which is less sensitive to bill inclination in the passageway.

The embodiment shown in FIG. 1 also includes a filter arrangement 28 between the base 14 and the photodetector 25. This preferably is an ultraviolet absorbing film filter. With this arrangement, the LED is preferably a 5 mm bulb ultraviolet LED under the trademark HUUV-5102L sold by Roithner Lasertechnic or general equivalent. Thus the bill 12 is exposed to ultraviolet radiation with the reflected signal and any luminous signals of the bill returning through the LED to the photodetectors 25 and 26. Photodetector 26 receives the entire signal whereas the signal received by photodetector 25 is absent any ultraviolet portion.

The embodiment of FIG. 1 produces a signal at photodetector 26 which is a result of all light radiation striking the detector. In contrast, photodetector 25 is a similar signal but with the UV component removed. Ambient light can also influence photodetectors, however, the positioning of the photodetectors beneath the LED and the plastic casing of the LED acting as a light transmitting guide to the photodetectors, reduces problems associated with ambient light. Furthermore, ambient light is generally associated with the bill passageway 20 and the structure of the optical sensor locates the photodetectors, a significant distance away from the passageway. In this way, the photodetectors are not as sensitive to ambient light in the passageway.

Optical sensor 2 is located in its own casing having its own transparent wall 11 which forms part of the passageway. This forms a module with the printed circuit board and the LED located within a housing typically formed of a non transparent plastic with the exception of the transparent wall 11. The elongate form of the optical sensor advantageously uses the LED to not only produce radiation for illuminating the bill but it also uses the LED as a light guide for directing the reflected radiation to the photodetectors located beneath the LED. Opposite passageway wall 13 is made from white non fluorescent ABS plastic. Reflection signal from this wall is used for apparatus self calibration when bill is absent in passageway.

Figure 2:
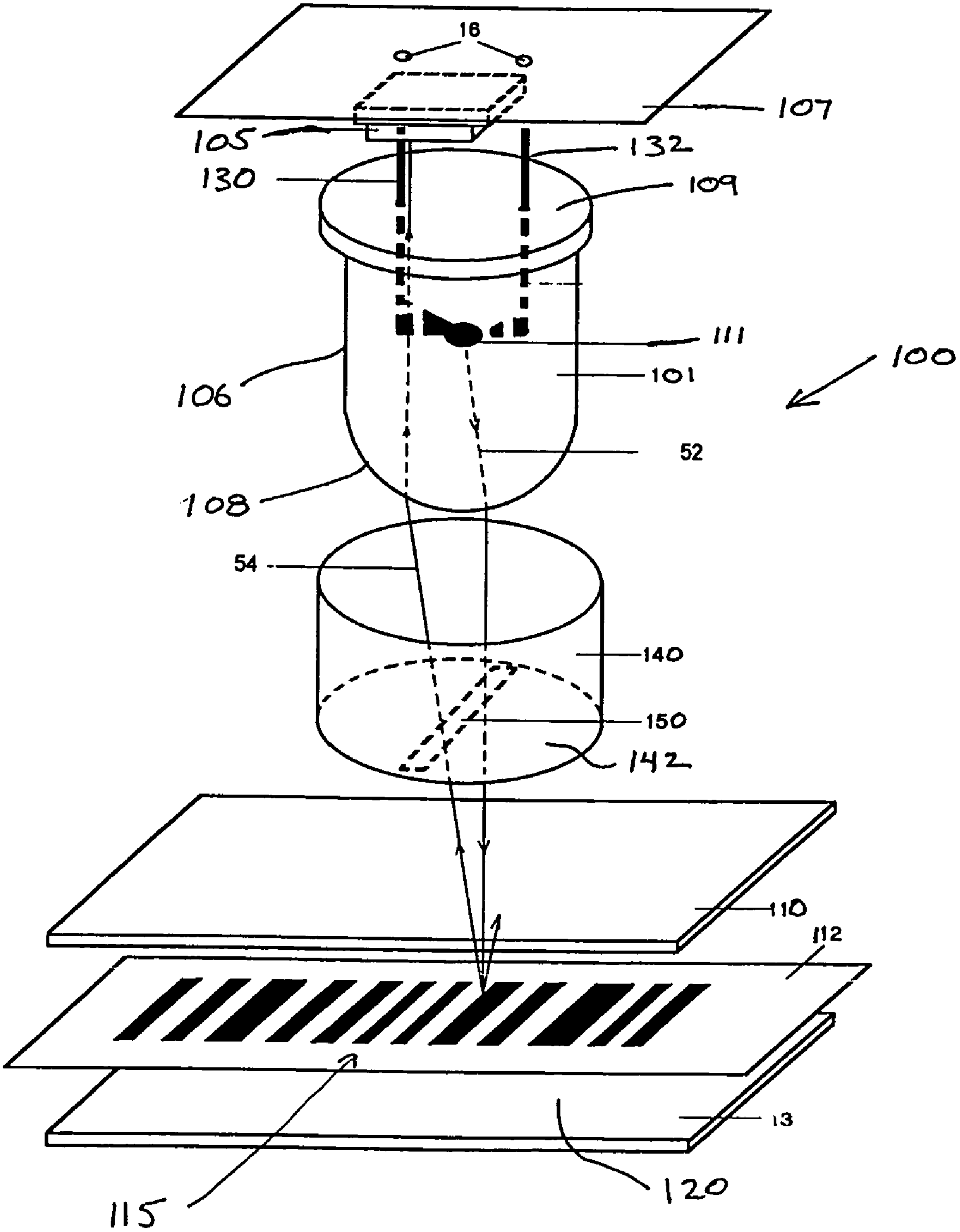
FIG. 2 is an exploded enlarged perspective assembly view of optical sensor for bar-code reading and bill edge detection.

FIG. 2 is a perspective view of an alternate embodiment of the optical sensor. The optical sensor 100 is positioned adjacent the transparent wall 110 in the bill passageway 120 having an exterior wall 113. The bill 112 or other document is shown having a bar code 115. The optical sensor 100 includes a printed circuit board 107 having a photodetector 105 mounted thereon. The photodetector 105 is exposed to the reflected radiation which will pass back through the LED 101. This LED has a transparent outer casing 104 made up of a cylindrical portion 106, a convex end portion 108, and a generally planar transparent base 109. The LED includes its own light source 111 within the LED which is designed to direct radiation out through the convex end 108. Connectors 130 and 132 support the light source 111 generally centered within the LED and connected and provides power to it from the printed circuit board 107.

A non transparent shield 140 covers the end of the LED and has a slit opening 150 for allowing the radiation to pass therethrough. As can be appreciated, some of the radiation will be reflected off the end wall 142 of the end cap, however, this will be a constant signal back to the photodetector 105 where various arrangements can be used to reduce this radiation component. A portion of the produced radiation will pass through the slot 150 and will provide a narrow radiation source for illuminating the individual bars of the bar code 115 as they pass by the optical sensor. The signal which is returned to the photodetector through the LED 104 acting as a wave guide and through the transparent base 109 to the photodetector will vary in accordance with the bar code 115. This arrangement has proven to provide a very effective means for reading of the bar code and providing good quality results with the various possible misorientations of the bar code within the passageway 120. As can be appreciated, the optical sensor 100 and the transparent wall 110 can be integrated into a single module which is inserted in a suitable port in the wall of the bill passageway of a validator or other sensing device.

The arrangement of FIG. 2 is also effective in identifying a bill edge. This is particularly useful for detecting a leading or trailing edge of a bill as it moves past the sensor.

With the embodiment of FIG. 2, the beam of light eradiating the bill has a small angle of divergence so the light divergence on the bill surface does not exceed 0.3 mm. A red LED LTL2F3VEKNT by LITE-ON Inc. and IC photo detector S7184 or S7815 by HAMAMATSU Co. can be used in the bar-code detector.

Figure 3:
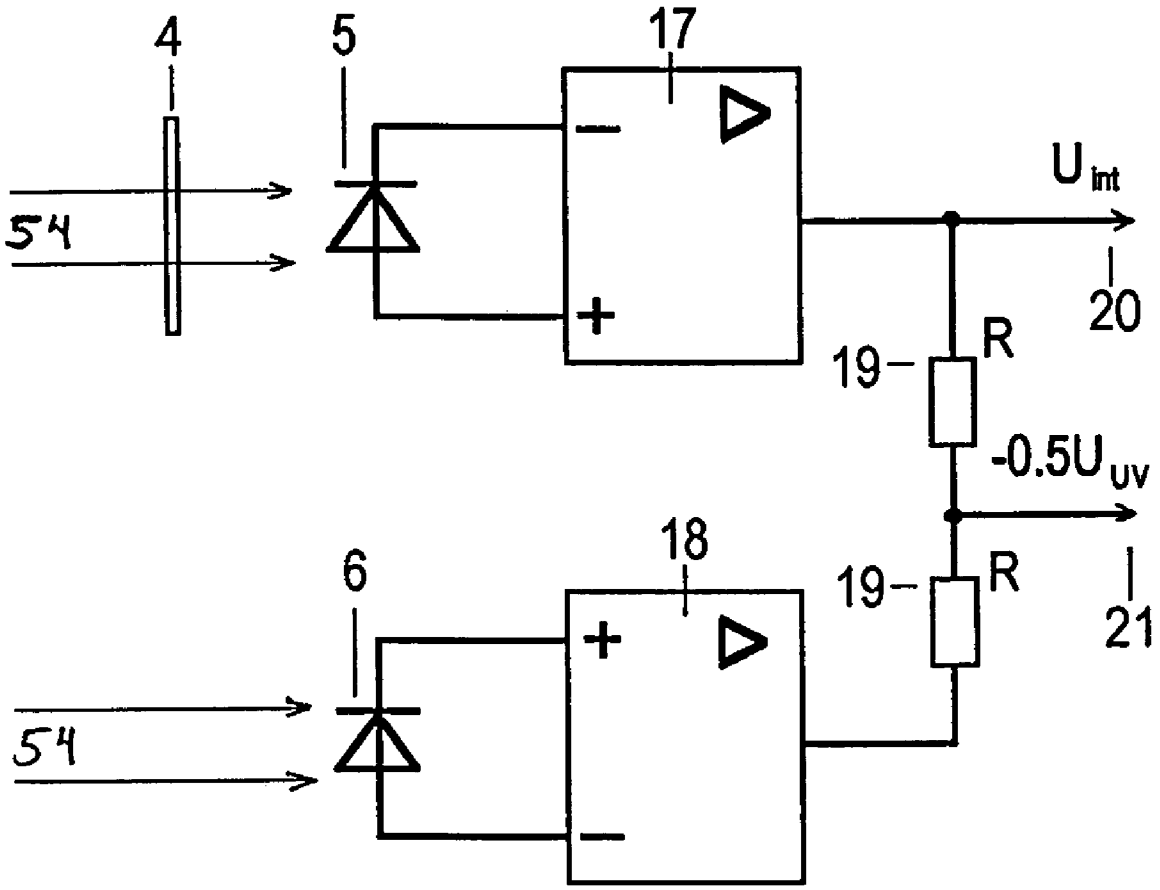
FIG. 3 is a block diagram of hardware component processing of signals in ultraviolet optical sensor.

FIG. 3 is a block diagram of hardware components used to process signals in an ultraviolet optical sensor. Light 10 reflected from the bill surface is received by photodiode 6 (integral light detector) and is received by photodiode 5 (detector of visible light) after passing through UV absorbing filter 4. Signal $U_{int}$, proportional to visible light intensity, proceeds from the output 20 of amplifier 17. This signal describes the fluorescent properties of the bill paper and dyes. Signal $-(U_{int}+U_{UV})$, proportional to total light outgoing from bill, proceeds from the output of amplifier 18 to resistor adder 19. Under equal transfer constants of amplifiers 17, 18 and resistors R in adder unit 19 at the output 21, outgoing signal $\frac{1}{2}[U_{int}-(U_{int}+U_{UV})]=-\frac{1}{2}U_{UV}$ is developed. This signal describes the ultraviolet reflection of bill surface. Signals from outputs 20, 21 are used in a processor module for bill authorization and discrimination. For example, a large value of $U_{int}$ signal indicates that bill may be counterfeit—i.e. a photocopy on a wood-based paper.

Figure 4:
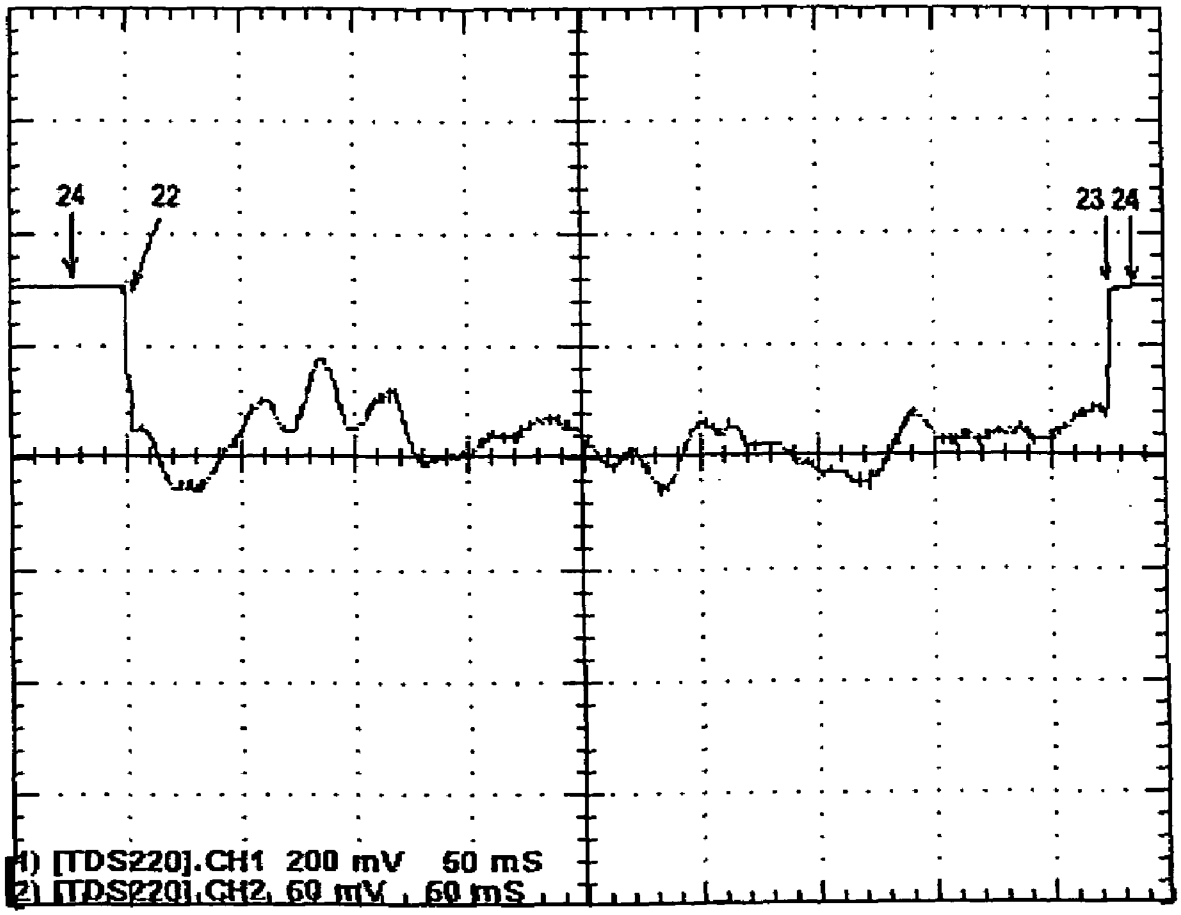
FIG. 4 is a typical signal of genuine bill ultraviolet scanning in FIG. 1 embodiment.

FIG. 4 is a typical signal $U_{int}$ of genuine bill ultraviolet scanning in FIG. 1 embodiment. Scanning speed is about 300 mm/sec. Point 22 indicates the moment of bill leading edge passing by optical sensor. Point 23 indicates the moment of bill trailing edge passing by optical sensor. The signal at 24 (bill is absent in passageway) is caused by back wall 13 reflectance of blue components of illuminating light and by light reflected from all transparent interfaces (about 6% on each)—boundaries between LED and air, air and wall 11, wall 11 and air. The signal at 24 is used for apparatus self calibration. Signal $U_{int}$ between points 22 and 23 is caused by bill paper and dyes fluorescence and reflectance of blue components of illuminating light.

Figure 5:
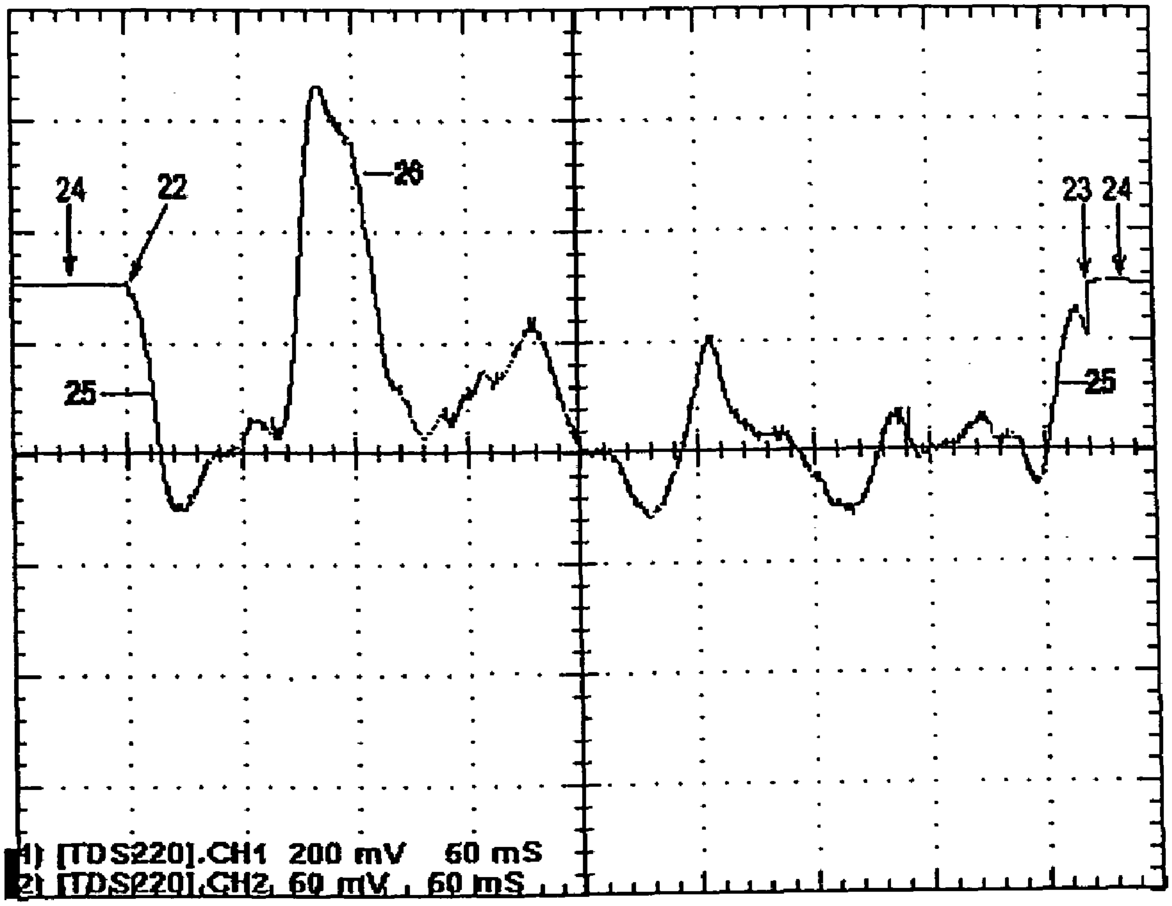
FIG. 5 is a typical signal of counterfeit bill ultraviolet scanning in FIG. 1 embodiment.

FIG. 5 is a typical signal $U_{int}$ of a counterfeit bill (similar to previous genuine bill) ultraviolet scanning in FIG. 1 embodiment. Scanning speed is about 300 mm/sec. Points 22-24 indicate the same as in previous illustration. Bands 25 indicate strong fluorescence from leading and trailing bill borders. Band 26 indicates the strong fluorescence from paper bill surface in the watermark zone. Signal $U_{int}$ strongly differs on genuine and counterfeit bills and is easily used in the processor module to identify counterfeit bills.

Figure 6:
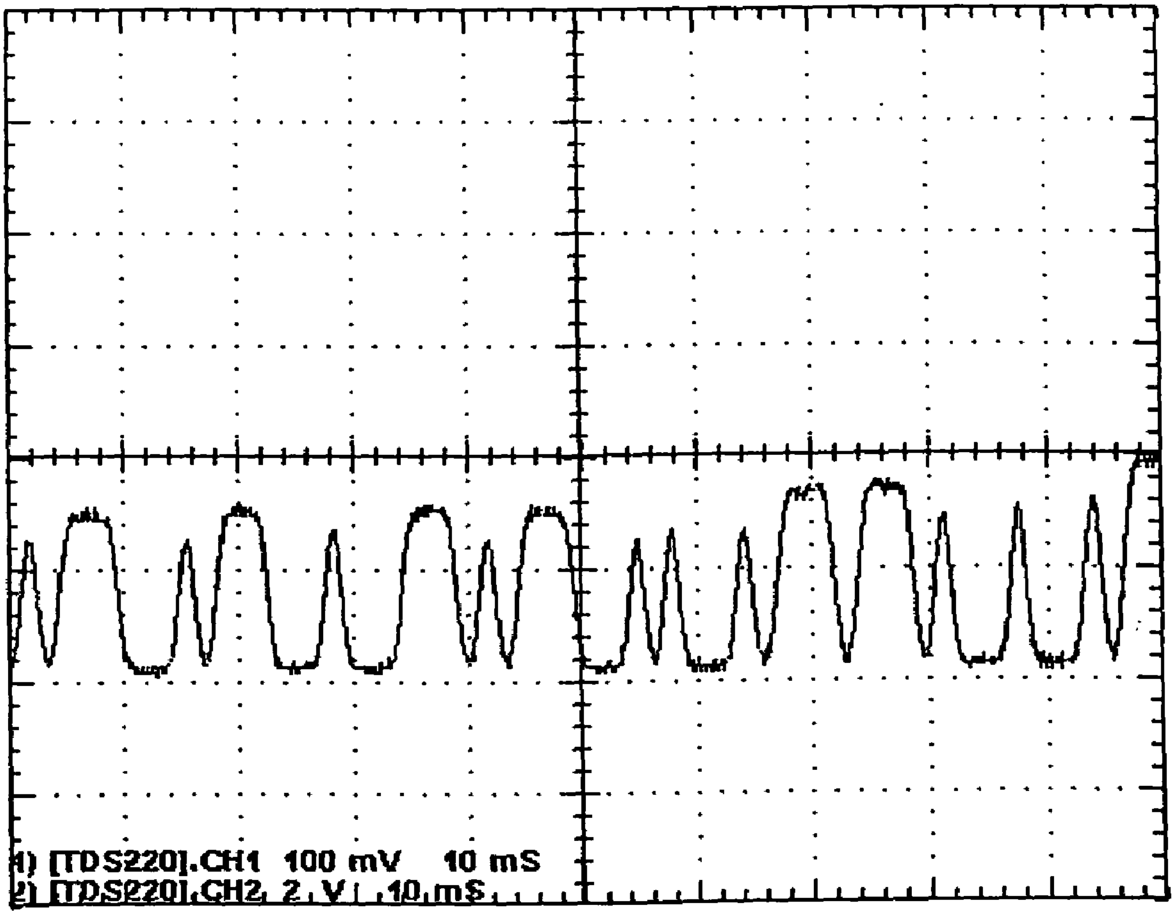
FIG. 6 is a typical signal of bar code scanning in FIG. 2 embodiment.

FIG. 6 is a typical signal of bar code scanning in FIG. 2 embodiment. The slit 15 in opaque cap 14 is 5 mm length and 0.4 mm wide. Scanning speed is about 300 mm/sec. This arrangement provides a good spatial resolution with bar distance and width less then 0.5 mm.

The present invention is described herein in the context of a banknote application used in a verification device, automatic cash machine or other bills handling device, in a bank, postal facility, supermarket, casino or transportation facility. However, it is appreciated that the embodiments shown and described herein may also be useful for checking other objects, particularly flat objects, such as cards, films, paper sheets and paintings. The checking device may be stationary or portable, battery powered or powered by connection to an electric outlet.

It is appreciated that various features of the invention, which are, for clarity, described in the contexts of separate embodiments, may also be provided in combination in a single embodiment. Conversely, various features of the invention which are, for brevity, described in the context of a single embodiment, may also be provided separately or in any suitable combination.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A validation device for assessing the authenticity of bills comprising
- a bill passageway,
- an optical sensing arrangement to one side of said passageway and opening onto said passageway for directing radiation onto a bill as it moves past said optical sensing arrangement and for receiving radiation reflected from said bill,
- an arrangement for processing an output signal of said optical sensing arrangement and producing an evaluation signal, and
- an evaluation system that uses said evaluation signal and based thereon makes a prediction of the authenticity of the bill;
- said optical sensing arrangement includes a light emitting diode having at least one photodetector adjacent a base thereof, said light emitting diode having a light transmitting case thereabout and positioned to act as a light guide for radiation received at an end of said case opposite said photodetector.

2. A validation device as claimed in claim 1 wherein said light transmitting case of said light emitting diode includes a convex end facing said bill passageway which acts as a lens to direct emitted radiation onto said bill and to receive and direct reflected radiation impinging on said convex end through said case to said photodetector.

3. A validation device as claimed in claim 2 wherein said light transmitting case of said light emitting diode has a generally flat bottom adjacent said photodetector and said photodetector is located below said flat bottom.

4. A validation device as claimed in claim 3 wherein said convex end of said light transmitting case of said light emitting diode is immediately adjacent said bill passageway.

5. A validation device as claimed in claim 4 wherein said convex end of said light transmitting case of said light emitting diode is of a width greater than a spacing between said convex end and a centerline of said bill passageway.

6. A validation device as claimed in claim 1 wherein said light emitting diode is a directional emitter directing emitted radiation through an end of said light transmitting case of said light emitting diode.

7. A validation device as claimed in claim 6 wherein said light emitting diode is designed to emit ultraviolet radiation.

8. A validation device as claimed in claim 7 additionally comprising an ultraviolet absorbing thin film filter located between said light emitting diode and said photo detector.

9. A validation device as claimed in claim 6 wherein said light emitting diode is designed to emit white light.

10. A validation device as claimed in claim 9 further comprising a band-pass or rejection colored thin film filters located between said light emitting diode and said photo detector.

11. A validation device as claimed in claim 6 wherein said light emitting diode is designed as multicolor multi chip light emitting diode.

12. A validation device having an optical sensing arrangement, said optical sensing arrangement includes a light emitting diode having at least one photodetector adjacent a base thereof, said light emitting diode having a light transmitting case thereabout and positioned to act as a light guide for radiation received at an end of said case opposite said photodetector;

said validation device including a processing arrangement for processing an output signal of said photodetector.

13. A validation device as claimed in claim 12 wherein said light emitting diode includes a non transparent shield member at an end of case opposite said photodetector, said shield member having a slit therein for allowing a thin beam of radiation to pass therethrough and to allow reflected radiation to pass through said slit to said case for guiding to said photodetector.

14. A validation device as claimed in claim 13 used for reading of bar codes moved past said optical sensing arrangement.

15. A method of document examination comprising:

perpendicular narrow-beam illumination of a part of the surface of the document by means of a transparent body bulb ultraviolet light emitting diode;

collection of the mirror and diffuse reflected light and fluorescent light from said illuminated document part by means of a convex end of said light emitting diode which acts as a lens;

transmission of said collected light through the light emitting diode body to a photo detector positioned adjacent to said light emitting diode base;

filtering of said transmitted light with absorption and/or band pass filters between said light emitting diode and photo detector; and processing of an output signal of said photodetector for document identification and validation.

16. A method as claimed in claim 15 wherein said light emitting diode is an ultraviolet light emitting diode and;

said filtering of the transmitted light includes ultraviolet absorption and/or band-pass filters and detecting the filtered transmitted light with the photo detector; and including separate processing of steady and alternate photo signal components from said photo detector for bill identification and validation.

17. A method as claimed in claim 15 for sequential evaluation of optical characteristics of a bill wherein said light emitting diode is a multicolor multichip light emitting diode that provides sequential perpendicular narrow-beam illumination of said bill part with varicolored light; and wherein said processing of said output signal includes sequential detection and processing of said varicolored light components for bill identification and validation.

18. A method as claimed in claim 15 wherein said light emitting diode emits ultraviolet light and said document is a banknote.

19. A method as claimed in claim 15 for detecting bar code on a substrate wherein said light emitting diode produces monochrome light and only a portion of the produced monochrome light passes through a narrow, slight sized to produce a narrow beam of monochrome light;

moving the document in a direction generally perpendicular to the narrow beam of monochrome light to illuminate a bar code surface of the document; and processing of an alternating output signal component from the photo detector for bar code identification.

* * * * *